(12) United States Patent
Chen

(10) Patent No.: US 8,899,490 B1
(45) Date of Patent: Dec. 2, 2014

(54) SMART CARD

(71) Applicant: Huei-Chyuan Chen, Taipei (TW)

(72) Inventor: Huei-Chyuan Chen, Taipei (TW)

( * ) Notice: Subject to any disclaimer, the term of this patent is extended or adjusted under 35 U.S.C. 154(b) by 0 days.

(21) Appl. No.: 13/922,618

(22) Filed: Jun. 20, 2013

(30) Foreign Application Priority Data

May 31, 2013 (CN) .......................... 2013 1 0213383

(51) Int. Cl.
*G06K 19/06* (2006.01)
*G06K 19/077* (2006.01)
*G06K 19/073* (2006.01)

(52) U.S. Cl.
CPC ........ *G06K 19/07707* (2013.01); *G06K 19/073* (2013.01)
USPC ....................................................... 235/492

(58) Field of Classification Search
CPC .......... G06K 7/10237; G06K 7/10297; G06K 7/10316; G06K 19/07788; G06K 19/07775; G06K 19/0713
USPC ........................................................ 235/492
See application file for complete search history.

(56) References Cited

U.S. PATENT DOCUMENTS

| | | | | |
|---|---|---|---|---|
| 7,942,338 B2* | 5/2011 | Koyama et al. | ............... | 235/492 |
| 2011/0298591 A1* | 12/2011 | Mickle et al. | ............... | 340/10.33 |
| 2013/0176053 A1* | 7/2013 | Gammel et al. | ............... | 326/51 |
| 2013/0299593 A1* | 11/2013 | Glidden, III | ............... | 235/492 |
| 2014/0071869 A1* | 3/2014 | Mathew et al. | ............... | 370/311 |

* cited by examiner

*Primary Examiner* — Allyson Trail
(74) *Attorney, Agent, or Firm* — Muncy, Geissler, Olds & Lowe, P.C.

(57) ABSTRACT

A smart card includes a main stuff body and a data display module. The main stuff body includes a RF antenna, a charge pump module, a first processing module, and a second processing module. The RF antenna is utilized for receiving a read/write signal and a card data signal. The charge pump module is applied for generating inductive working power by coupling resonance when the RF antenna receives the card data signal. The first processing module is deployed for receiving the read/write signal and transmitting a data signal representing the card data to the reader/writer. The second processing module is utilized for transforming the card data signal into a displaying signal for showing the card data. The data display module is applied for receiving the displaying signal to show the card data by inductive working power and keeps in displaying the card data when inductive working power is gone.

6 Claims, 4 Drawing Sheets

SMART CARD

FIELD OF THE INVENTION

The invention subject relates to a smart card, particularly more relates to a smart card having two processing modules which sharing a common antenna, and a charge pump module for generating power, in order to have a data display module for showing the data stored within the card.

BACKGROUND OF THE INVENTION

Following with the advance of technology and progress to the era of information, wireless communication technologies become mature and improved, and it has been applied to various fields to make our life more fruitful and convenient. Among the present wireless communication technologies, radio frequency (RF) wireless technology is the one of most implementation to our daily life.

Among the technological development of RF wireless technology, radio frequency identification (RFID) technology is one of topic has been focused. RFID, also known as e-Tag, is a kind of communication technology featuring the usage of radio-frequency electromagnetic coupling fields to transfer data, for the purposes of identifying the specific objects and read write the data concerned. RFID technology is a wireless non-contact identification technology without the necessity of any mechanical or optical contact. Thus, it has become quite popular and merged in life of everyday.

For example, RFID can be used in manufacturing lines for tracking and controlling the process of manufacture, in order to improve its efficiency. RFID can also be used for helping people to distinguish the real and fake of merchandise. In our daily lives, RFID has been deployed and integrated in various applications such as personal identification of Mass Rapid Transmit system, (MRT) and payment of parking charge and convenient stores, also to those of application which could be simplified and speed up with its transaction and processes.

However, the traditional RFID smart cards are in short of the capability to show the card data, so after haven't use the card for a while, such as the MRT user they cannot make sure how much money was left in the card. If he wants to know the remaining amount in the card, he must find a card reader to check the balance of card. In addition, most of smart cards with display in present are implemented with battery, therefore they cannot be sealed thoroughly. These smart cards are unable to fulfill the requirement of shockproof, shatterproof, waterproof, moisture protection, and last for a long usage time. Thus, there is a motivation of innovation to the existed and traditional smart cards.

BRIEF SUMMARY OF INVENTION

The traditional smart cards lack the ability to show the card data in real time, particularly after using the card, and most of smart cards with display has to be implemented with battery, thus, unable to fulfill the needs of shockproof, shatterproof, waterproof, moisture protection, and a long lasting usage time.

Accordingly, it would be the main object of present invention to provide a smart card, which features a charge pump module, which is in resonance and coupling with the electromagnetic wave generated during the usage of the smart card, so be able to generate the working power required, in order to have a data display module showing the card data stored within the card.

According to the object mentioned above, a smart card is furnished in the present invention. The smart card deployed is utilized for receiving a read/write signal, and a card data signal from a reader/writer, then be able to show the card data represented by the data signal concerned. The smart card subject comprises a main stuff body and a data display module. The main stuff body includes a radio frequency (RF) antenna, a charge pump module, a first processing module, and a second processing module. The RF antenna is applied for receiving the read/write signal and the card data signal. The charge pump module is electrically connected to the RF antenna for generating inductive working power by coupling resonance, during the time when the RF antenna receiving the card data signal. The first processing module is electrically connected to the RF antenna and the charge pump module, for receiving the read/write signal from the RF antenna and transmitting a data signal representing the card data to the reader/writer through the RF antenna accordingly.

The second processing module is electrically connected to the RF antenna and the charge pump module, for receiving the card data signal from the reader/writer, which transmits the card data signal according to the data signal, and transforming the card data signal into a display signal for showing the card data. The data display module is assembled on the main stuff body and electrically connected to the charge pump module and the second processing module, for receiving the display signal to show the card data by using the inductive coupling working power.

In accordance with a preferred embodiment of the present invention, the first processing module is a smart card based IC chip, and the second processing module is a micro controller unit (MCU) chip, the charge pump module is a charge pump for keeping and pull high the working voltage, the data display module is an electronic paper display (EPD), which is capable to display the card data by numeric characters, or a combination of alphanumeric, even when power is disappeared or off. Thereof in addition, the RF antenna is utilized further for receiving an overwrite signal from the reader/writer, and the first processing module overwrites the card data according to the overwrite signal after receiving the overwrite signal through the RF antenna.

In accordance to a preferred embodiment of the invention subject, the first processing module includes a data storage unit, and the data storage unit concerned is an electrically erasable programmable read-only memory (EEPROM) for storing the card data and overwriting the card data. In addition, the data display module will be functioned as an alarm module, which is utilized for display an alarm message, such as, when the second processing module receives the card data signal but fail to convert it.

Therefore, because the smart card of the invention subject has two processing modules sharing a common RF antenna and when the reader/writer transmits electromagnetic waves to be sensed the above mentioned processing modules, the charge pump module is in resonance with the electromagnetic waves to generate inductive coupling working power for the data display module, in order to show the card data, the user can see the card data in real-time and does not need to use a separate reader/writer to check the balanced amount.

In addition, because the smart card of the present invention receives the electric power by means of inductive coupling, the smart card can be sealed thoroughly to fulfill the requirement of shockproof, shatterproof, waterproof, moisture protection, and a long lasting usage time.

The embodiments adopted in the present invention would be discussed further by using the flowing paragraph and the figures for a better understanding.

DETAILED DESCRIPTION OF THE INVENTION

There are various embodiments of the smart card in accordance with the present invention, which are not intent to illustrate separately hereby. The preferred embodiments are described in the following paragraph as an example. It should be understood by those skilled in the art that the preferred embodiments disclosed in the following paragraph are merely an example, instead of restricting the scope of the invention itself.

Figure 1:
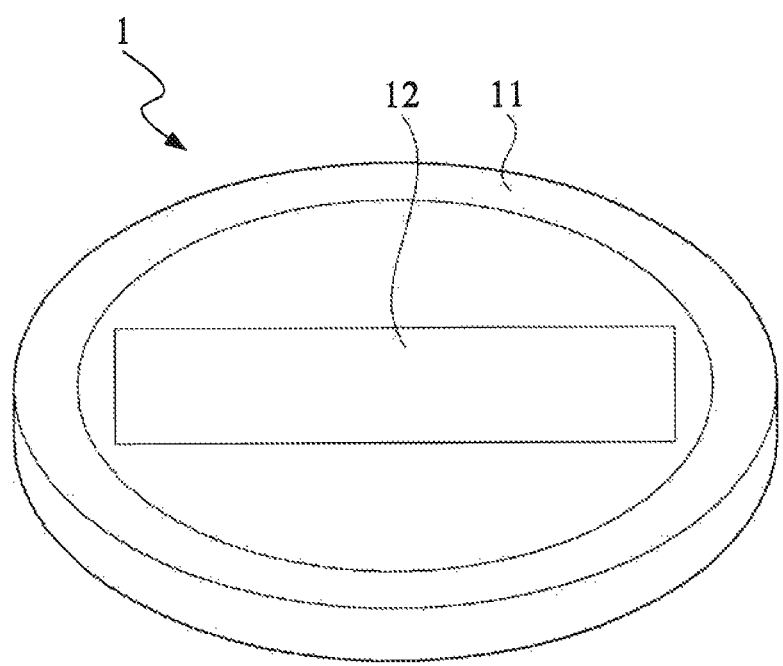
FIG. 1 is a schematic in 3D view showing the smart card in accordance with a preferred embodiment of the present invention.
Figure 2:
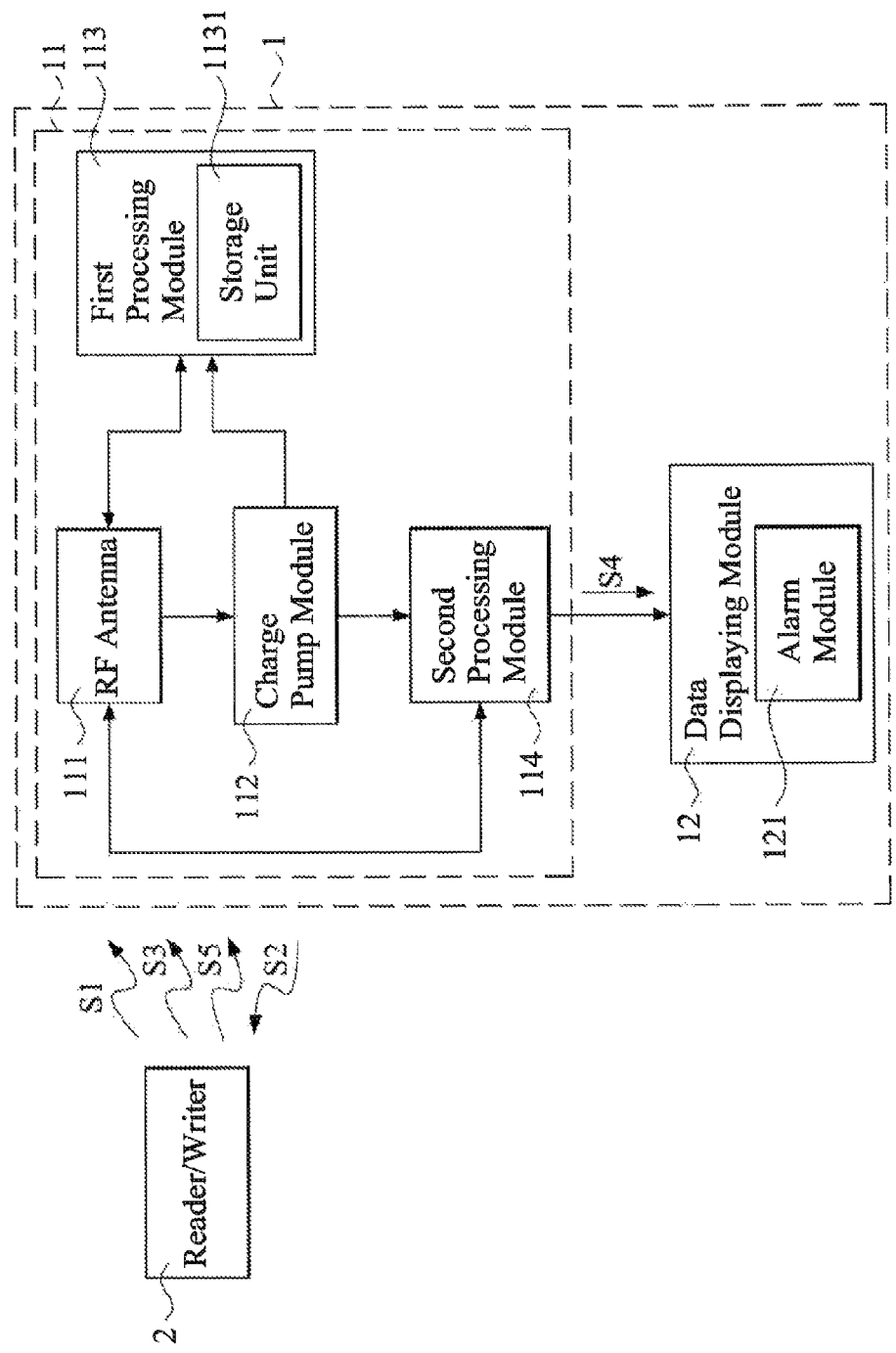
FIG. 2 is a block diagram showing the smart card in accordance to a preferred embodiment of the invention subject.

Please refer to both FIGS. 1 and 2, wherein FIG. 1 is a schematic in 3D view showing the smart card in accordance with a preferred embodiment of the present invention, and FIG. 2 is a block diagram showing the smart card in accordance with a preferred embodiment of the present invention. As shown, the smart card 1 of the present embodiment is a smart card in a shape of typical coinage, and features with a sensing range. Within the sensing range, the smart card 1 is capable to wirelessly communicate with the reader/writer 2. The reader/writer 2 may used the antenna (not shown) with a plurality of coils.

In the present embodiment, the smart card 1 includes a main stuff body 11 and a data display module 12. The main stuff body 11 includes a radio frequency (RF) antenna 111, a charge pump module 112, a first processing module 113, and a second processing module 114, therein. The RF antenna 111 may be an existing antenna, e.g. the antenna with a plurality of coils for coupling the reader/writer 2, and the RF antenna 111 is wirelessly communicated with the reader/writer 2, as the reader/writer 2 is within the sensing range mentioned above.

The charge pump module 112 is electrically connected to the RF antenna 111. In the present embodiment, the charge pump module 112 is a charge pump, which is composed of capacitors and a switching circuit, such as switch-mode regulator boost pumps, non-regulated capacitor charge pumps, or regulated capacitor charge pumps. However, the present invention is not so restricted, any charge pump be capable to store electric power can be used in the present invention. Moreover, in accordance with the present embodiment, the charge pump module 112 is electrically connected to the RF antenna 111 through an LC series resonant circuit. The LC series resonant circuit can be an existing circuit with a resonant frequency identical to the emission frequency of the reader/writer 2 as well.

The first processing module 113 is electrically connected to the RF antenna 111 and the charge pump module 112, and the first processing module 113 includes a data storage unit 1131 for storing card data, such as the amount of stored money, the duration of parking permission, but not restricted to the scenario illustrated. Besides, the first processing module 113 is a smart card based IC chip, in accordance with a preferred embodiment of the present invention, the standard card IC MIFARE 1 S50 can be used as the first processing module 113 to fulfill the standard ISO/IEC 14443A and provide the advantages of cloning protection, data encryption, anti-collision, and low cost, and the data storage unit 1131, may be an electrically erasable programmable read-only memory (EEPROM) with multiple sectors for storing the card data.

The second processing module 114 is electrically connected to the RF antenna 111 and the charge pump module 112. In the present embodiment, the second processing module 114 is a micro controller unit (MCU) chip. However, the invention subject is not restricted to a specific chip, those of existing chips with similar processing capability can be applied in the present invention as the second processing module 114.

In addition, it is noted that both the first processing module 113 and the second processing module 114 are electrically connected to the RF antenna 111 and share the common RF antenna 111, in order to execute data transmission. However, the present invention is not so restricted. In the other embodiments, the RF antenna 111 may be integrated into the first processing module 113 or the second processing module 114, and the charge pump module 112 may be integrated into the first processing module 113 according to the necessity in practice.

The data display module 12 is assembled on the main stuff body 11 and is exposed through the main stuff body 11. The data display module 12, is electrically connected to the charge pump module 112, and the second processing module 114. In the present embodiment, the data display module 12, is an electronic paper display (EPD), which is commonly used in the industry and thus is not reiterated in here.

In addition, in the present embodiment, the data display module 12, comprises an alarm module 121, and the alarm module 121 is integrated into the data display module 12. in short, a portion of the data display module 12 is being arranged as the alarm module 121. The alarm module 121 may generate an alarm signal by changing the background or contrast of the display or triggering some of symbolic indicator on it.

When the user using the smart card 1 of the subject invention, the reader/writer 2 transmits a read/write signal S1 to the smart card 1, as the smart card 1 is within the sensing range of the reader/writer 2. The RF antenna 111 of the smart card 1 receives and transmits the read/write signal S1 to the first processing module 113. The first processing module 113 receives the read/write signal S1 and reads out the data from the data storage unit 1131 according to the read/write signal S1. In the meanwhile, the first processing module 113 generates a data signal S2 as well based on the card data interpreted and has the data signal S2 transmitted to the reader/writer 2 by using the RF antenna 111.

After receiving the data signal S2, the reader/writer 2 decodes the data signal S2 with the data received, and then generates and transmits a card data signal S3 according to the card data decoded. The RF antenna 111 of the smart card 1 receives and transmits the card data signal S3 to the second processing module 114. The second processing module 114 receives the card data signal S3, converts the data signal S3 into a display signal S4, for displaying the card data, then transmits the display signal S4 to the data display module 12. After receiving the display signal S4, the data display module 12 displays the card data according to the content of display signal S4.

In addition, when the second processing module 114 receives the card data signal S3, the alarm module 121 generates an alarm signal. For example, the alarm module 121 may generate the alarm signal by changing the contrast or background of the data displaying module 12. In detail, the data display module displays the card data by using numeric characters, or a combination alphanumeric thereof. In accordance with a preferred embodiment of the present invention, the data display module is an EPD and the alarm module 121 is integrated into the displaying module 12. For example, the left most portion of the data display module 12, can be assigned as the alarm module 121, the background of the EPD may be shown in a reversed mode, and the number of symbols shown in the left most portion can be used to represent different alarm functions. In addition, the other portion of the data display module 12 can be used as the display module for showing the necessary message and the numbers. For example, the display module 12 may have furnished with display units of 7 segments, or 16 segments shaped display integrated, in order to show the message in characters of alphanumeric. However, the present invention is not so restricted.

Moreover, the RF antenna 11 may be also capable to receive an overwrite signal S5 from the reader/writer 2. The first processing module 113 receives the overwrite signal S5 from the RF antenna 11 and then overwrites the card data in the data storage unit 1131, according to the overwrite signal S5 to update the card data in the data storage unit 1131.

Further more, when the RF antenna 111 receives the read/write signal S1, the card data signal S3 and the overwrite signal S5 transmitted from the reader/writer 2, because the frequency of the LC resonant circuit is identical to the emission frequency of the reader/writer 2, the energy of these electromagnetic signals will be transferred to the LC resonant circuit and stored in the capacitor (not shown) by inductive resonance. The other end of the capacitor is connected to the charge pump module 112, so that the generated preliminary working voltage can be transferred and stored in the capacitors of the charge pump module 112 for generating the inductive working power supplied to the data display module 12 to display the card data.

Figure 3:
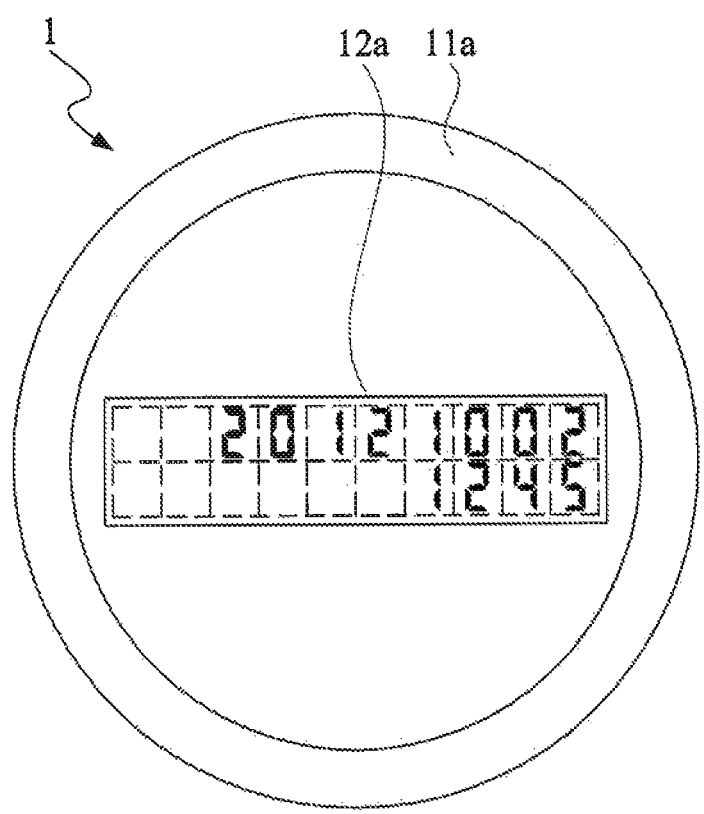
FIGS. 3 and 3A are schematic views for showing the application of the smart card in accordance with a preferred embodiment of the present invention.
Figure 3A:
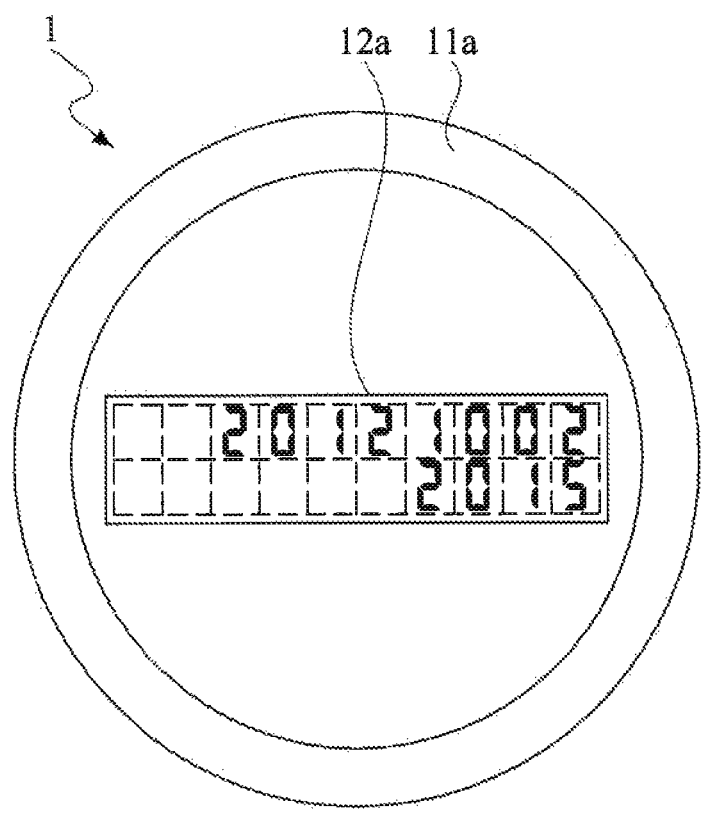

For a better understand of the applications of the present invention, please refer to both FIGS. 3 and 3A, which show the schematic views of the usage of the smart card in accordance with a preferred embodiment of the present invention. As shown, when the user enters a parking lots by using a smart card 1a, the reader/writer (not shown) in the lots concerned trans an overwrite signal (not shown) to the smart card 1a, according to the current time and date, then, the first processing module (not shown) in the smart card 1a, overwrites the storage unit (not shown) by using the above mentioned date and time and then transmits the data signal (not shown) to the reader/writer by using the RF antenna (not shown). After receiving the data signal, the reader/writer generates and sends the card data signal (not shown) according to the data signal to the second processing module (not shown). The second processing module generates the display signal (not shown) according to the card data signal and transmits the display signal to the data display module 12a, to have the data display module 12a, showing the current date and time (the card data as shown in FIG. 3). In some of illustrated embodiments, the left most portion of the data display module may further show the alarm signal. Similarly, when the user leaves the parking lots, the procedure mentioned above are repeated, in order to have the data display module 12a showing the corresponded card data as shown in FIG. 3A. In the present embodiment, the data display module 12a shows the card data merely by using numeric characters.

In the other applications, such as the application in MRT, the reader/writer transmits the read/write signal to the smart card when the user entering the station, and after the process of the first processing module and the second processing module, the card data such as the code of current entering station, B05, and the date and time of entering, the ticket value, or the remaining amount of value card, can be displayed on the data display module 12a as a printed validation for those of exception, so that if there is any error happened when the user leaving the station, the displaying data can be used as a proof to prevent dispute. When the user leaving the station, the reader/writer will transmit the overwrite signal to the smart card to do the procedure mentioned above, so does the data display module 12a showing the remaining amount of ticket value.

In addition, because the data display module 12a of the present invention is an EPD, the related card data could be displayed on the data display module 12a, even when the supplying power is gone. Moreover, the user can check the card data in real time, nonetheless by using the traditional smart card without display functionality, if the user does not have the smart card to be sensed its read write successively, when entering the station, it would be difficult to proof and give an exactly charge. On the contrary, by using the smart card with the present invention, it is much easier for the user to recognize if the smart card is successively sensed and read write, because the displayed data would be changed when the user enters the station, the problem mentioned above can be prevented.

In conclusion, the smart card of the present invention features two processing modules sharing one common RF antenna and a charge pump module which is capable to generate working power when the reader/writer transmits electromagnetic signals to the processing modules by inductive resonance such that the data display module can display the card data in real time by using the generated working power. Thus, the user can check the card data in real-time and does not need to find the specific reader/writer to do the balance check.

In addition, the smart card of the present invention can be thoroughly sealed to achieve the object of shockproof, shatterproof, waterproof, protection of moisture, and a long lasting usage time because the working power is generated by inductive coupling.

Moreover, because the smart card 1 of the present invention does not require the battery to provide the power needed, the size can be effectively reduced. As a preferred embodiment, the size of the smart card 1 of the present invention, e.g. a diameter of 38.5 mm and a thickness of 3.5 mm, is somewhat larger than the coins issued for circulation, particular it should not be miss deposited to those of coin acceptor upon self service ticket machine or parking pay station, also is quite suitable to adopt the counting and issuing means applied to the coins. In addition, it is still not difficult to distinguish the smart card with the regular coins, because the smart card 1 is much lighter in weight and does not give the heavy feeling as the coins.

In addition, as a preferred embodiment, the smart card 1 of the present invention is recyclable and can be read or written for at least hundred thousands of times. Thus, it is suitable to replace the traditional one-time use paper tickets to reduce the consumption of paper pulp, which is made of wood, so it should meet with requirement from environment protection.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined, by the appended claims.

What is claimed is:

1. A smart card, utilized for receiving a read/write signal and a card data signal from a reader/writer and showing card data represented by the card data signal, comprising:
 a main stuff body, including:
  a RF antenna, utilized for receiving the read/write signal and the card data signal;
  a charge pump module, electrically connected to the RF antenna for generating inductive working power by resonance when the RF antenna receiving the card data signal;
  a first processing module, electrically connected to the RF antenna and the charge pump module, for receiving the read/write signal from the RF antenna and transmitting a data signal representing the card data to the reader/writer through the RF antenna according; and
  a second processing module, electrically connected to the RF antenna and the charge pump module, for receiving the card data signal from the reader/writer, which transmits the card data signal according to the data signal, and transforming the card data signal into a display signal for showing the card data; and
 a data display module, assembled on the main stuff body and electrically connected to the charge pump module and the second processing module, for receiving the displaying signal to show the card data by using the inductive working power,
 wherein the data displaying module further comprises an alarm module, which is utilized for generating an alarm signal when the second processing module receives the card data signal.

2. The smart card of claim 1, wherein the first processing module is a smart card based IC chip, and the second processing module is a micro controller unit (MCU) chip.

3. The smart card of claim 1, wherein the charge pump module is a charge pump of keeping and pull high voltage, and the data display module is an electronic paper display (EPD).

4. The smart card of claim 1, wherein the RF antenna is further utilized for receiving an overwrite signal from the reader/writer, and the first processing module overwrites the card data according to the overwrite signal after receiving the overwrite signal through the RF antenna.

5. The smart card of claim 1, wherein the first processing module includes a storage unit, and the data storage unit is an electrically erasable programmable read-only memory (EE-PROM) for storing the card data and overwriting the card data.

6. The smart card of claim 1, wherein the data displaying signal displays the card data by using, numeric characters, or a combination of alphanumeric thereof.

* * * * *